United States Patent
Wang

(10) Patent No.: US 12,301,841 B2
(45) Date of Patent: May 13, 2025

(54) SUBPICTURE SUB-BITSTREAM EXTRACTION PROCESS ENHANCEMENTS

(71) Applicant: Bytedance Inc., Los Angeles, CA (US)

(72) Inventor: Ye-kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/516,468

(22) Filed: Nov. 21, 2023

(65) Prior Publication Data

US 2024/0098281 A1    Mar. 21, 2024

Related U.S. Application Data

(63) Continuation of application No. 18/077,831, filed on Dec. 8, 2022, now Pat. No. 11,997,294, which is a continuation of application No. PCT/US2021/036359, filed on Jun. 8, 2021.

(60) Provisional application No. 63/036,908, filed on Jun. 9, 2020.

(51) Int. Cl.
| | |
|---|---|
| *H04N 19/184* | (2014.01) |
| *H04N 19/169* | (2014.01) |
| *H04N 19/172* | (2014.01) |
| *H04N 19/182* | (2014.01) |
| *H04N 19/30* | (2014.01) |
| *H04N 19/597* | (2014.01) |
| *H04N 19/70* | (2014.01) |

(52) U.S. Cl.
CPC ......... *H04N 19/184* (2014.11); *H04N 19/172* (2014.11); *H04N 19/182* (2014.11); *H04N 19/188* (2014.11); *H04N 19/30* (2014.11); *H04N 19/597* (2014.11); *H04N 19/70* (2014.11)

(58) Field of Classification Search
CPC .... H04N 19/184; H04N 19/182; H04N 19/30; H04N 19/597
See application file for complete search history.

(56) References Cited

U.S. PATENT DOCUMENTS

| | | | |
|---|---|---|---|
| 9,942,545 B2 * | 4/2018 | Kwon | ................. H04N 19/573 |
| 11,924,446 B2 | 3/2024 | Wang | |
| 11,997,294 B2 | 5/2024 | Wang | |
| 2013/0114735 A1 | 5/2013 | Wang | |

(Continued)

FOREIGN PATENT DOCUMENTS

| | | | |
|---|---|---|---|
| JP | 2019506091 A  *  | 2/2017 | |
| JP | 7511680 B2 | 7/2024 | |
| JP | 7511681 B2 | 7/2024 | |

OTHER PUBLICATIONS

Scoopin Lowbert, translation of JP 2019506091 A, Feb. 2017 (Year: 2017).*

(Continued)

*Primary Examiner* — Zaihan Jiang
(74) *Attorney, Agent, or Firm* — Conley Rose, P.C.

(57) ABSTRACT

A method of video data processing includes performing a conversion between a video and a bitstream of the video. The bitstream comprises multiple layers comprising one or more subpictures according to a rule which specifies that, during a subpicture sub-bitstream extraction process by which an output bitstream is extracted from the bitstream, a supplemental enhancement information (SEI) network abstraction layer (NAL) unit that includes a scalable nested SEI message that is not applicable to the output bitstream is omitted in the output bitstream.

19 Claims, 12 Drawing Sheets

1300

1302 performing a conversion between a video and a bitstream of the video, wherein a rule specifies that, during a subpicture sub-bitstream extraction process by which an output bitstream is extracted from the bitstream, a supplemental enhancement information network abstraction layer unit, SEI NAL unit, that includes a scalable nested SEI message that is not applicable to the output bitstream is omitted in the output bitstream

(56) References Cited

U.S. PATENT DOCUMENTS

| | | | |
|---|---|---|---|
| 2014/0003489 A1 | 1/2014 | Hannuksela | |
| 2014/0086341 A1 | 3/2014 | Wang | |
| 2014/0092993 A1 | 4/2014 | Wang | |
| 2014/0192149 A1 | 7/2014 | Wang | |
| 2015/0015545 A1* | 1/2015 | Ting | G06F 3/0428 345/175 |
| 2015/0016545 A1 | 1/2015 | Ramasubramonian | |
| 2015/0103886 A1* | 4/2015 | He | H04N 19/70 375/240.02 |
| 2015/0103888 A1* | 4/2015 | Chen | H04N 19/172 375/240.02 |
| 2015/0189322 A1 | 7/2015 | He | |
| 2015/0264404 A1* | 9/2015 | Hannuksela | H04N 19/30 375/240.16 |
| 2015/0373374 A1* | 12/2015 | Ramasubramonian | H04N 19/46 375/240.27 |
| 2018/0220161 A1 | 8/2018 | Schierl | |
| 2018/0255322 A1 | 9/2018 | Wang | |
| 2018/0255323 A1* | 9/2018 | Wang | H04N 19/174 |
| 2020/0045323 A1* | 2/2020 | Hannuksela | H04N 19/51 |
| 2020/0077107 A1* | 3/2020 | Deshpande | H04N 19/172 |
| 2021/0203965 A1* | 7/2021 | Choi | H04N 19/188 |
| 2021/0360268 A1 | 11/2021 | Drugeon | |
| 2023/0068704 A1 | 3/2023 | Hendry | |
| 2023/0232011 A1 | 7/2023 | Sjöberg et al. | |

OTHER PUBLICATIONS

Document: JVET-S0099, Skupin, R., et al., "AHG12: SEI message handling in subpicture extraction", Joint Video Experts Team (JVET) of ITU-T SG 16 WP 3 and ISO/IEC JTC 1/SC 29/WG 11, 19th Meeting: by teleconference, Jun. 22-Jul. 1, 2020, 3 pages.
Japanese Office Action from Japanese Patent Application No. 2022-575699 dated May 28, 2024, 13 pages. With English Translation.
Document: JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.
"Information Technology—High efficiency coding and media delivery in heterogeneous environments—Part 2: High efficiency video coding," Rec. ITU-T H.265 | ISO/IEC 23008-2:201x (4th Ed.) (in force edition), Apr. 20, 2018, 8 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Bossen, F., Retrieved from the internet: VTM software: https://vcgit.hhi.fraunhofer.de/jvet/VVCSoftware_VTM.git, Mar. 1, 2023, 3 pages.
Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.
Karunakar, P., "Implementation of an out-of-the loop post-processing technique for HEVC decoded depth maps," The University of Texas at Arlington, Dec. 2013, 84 pages.
Document: JVET-Q0394-v2, Sanchez, Y., et al., "AHG9: On OLS extraction and scalable nesting SEI message," Joint Video Experts Team (JVET) of ITU-T SG 16 WP 3 and ISO/IEC JTC 1/SC 29/WG 11, 17th Meeting: Brussels, BE, Jan. 7-17, 2020, 12 pages.
Foreign Communication From a Related Counterpart Application, PCT Application No. PCT/US2021/036359, International Search Report dated Oct. 14, 2021, 15 pages.
Foreign Communication From a Related Counterpart Application, Indian Application No. 202247071688, Indian Office Action dated Feb. 10, 2023, 6 pages.
Foreign Communication From a Related Counterpart Application, PCT Application No. PCT/US2021/036363, International Search Report dated Sep. 17, 2021, 15 pages.
Foreign Communication From a Related Counterpart Application, PCT Application No. PCT/US2021/036369, International Search Report dated Sep. 10, 2021, 63 pages.
Non-Final Office Action dated Apr. 7, 2023, 19 pages, U.S. Appl. No. 18/077,823, filed Dec. 8, 2022.
Non-Final Office Action from U.S. Appl. No. 18/077,823 dated Oct. 25, 2023, 18 pages.
Non-Final Office Action from U.S. Appl. No. 18/077,831 dated Apr. 12, 2023, 27 pages.
Document: JVET-S0154-v1, Wang, Y., et al., "AHG9/AHG8/AHG12: On the subpicture sub-bitstream extraction process," Joint Video Experts Team (JVET) of ITU-T SG 16 WP 3 and ISO/IEC JTC 1/SC 29/WG 11 19th Meeting: by teleconference, Jun. 22-Jul. 1, 2020, 7 pages.
Document: JCTVC-P0182r2, He, Y., et al., "AHG9: On Sub-bitstream extraction and rewriting process," Joint Collaborative Team on Video Coding (JCT-VC) of ITU-T SG 16 WP 3 and ISO/IEC JTC 1/SC 29/WG 11, 16th Meeting: San José, US, Jan. 9-17, 2014, 8 pages.
Japanese Notice of Allowance from Japanese Application No. 2022-575706 dated May 28, 2024, 6 pages.
Japanese Decision to Grant a Patent from Japanese Patent Application No. 2022-575700 dated May 28, 2024, 2 pages.
Non-Final Office Action for U.S. Appl. No. 18/077,823, mailed Oct. 21, 2024, 34 Pages.
Document: JVET-S0152-v1, Wang, Y-K., "AHG2: Editorial Input of a Text Integration for the May 2020 HLS AHG Meeting Outcome," Joint Video Experts Team (JVET) of ITU-T SG 16 WP 3 and ISO/IEC JTC 1/SC 29/WG 11, 19th Meeting: by Teleconference, Jun. 22-Jul. 1, 2020, 4 pages.
Written Decision on Registration for Korean Application No. 10-2022-7043286, mailed Feb. 25, 2025, 12 pages.

* cited by examiner

SUBPICTURE SUB-BITSTREAM EXTRACTION PROCESS ENHANCEMENTS

CROSS-REFERENCE TO RELATED APPLICATIONS

This application is a continuation of U.S. patent application Ser. No. 18/077,831, filed on Dec. 8, 2022, which is a continuation of International Patent Application No. PCT/US2021/036359, filed on Jun. 8, 2021, which claims the priority to and benefits of U.S. Provisional Patent Application No. 63/036,908, filed on Jun. 9, 2020. All the aforementioned patent applications are hereby incorporated by reference in their entireties.

TECHNICAL FIELD

The present disclosure relates to image and video data processing.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of a video or an image.

In one example aspect, a method of processing video data is disclosed. The method includes performing a conversion between a video and a bitstream of the video, wherein the bitstream comprises multiple layers comprising one or more subpictures according to a rule; wherein the rule specifies that, during a subpicture sub-bitstream extraction process by which an output bitstream is extracted from the bitstream, a supplemental enhancement information (SEI) network abstraction layer (NAL) unit that includes a scalable nested SEI message that is not applicable to the output bitstream is omitted in the output bitstream.

In one example aspect, a method of processing video data is disclosed. The method includes performing a conversion between a video and a bitstream of the video, wherein the bitstream comprises multiple layers comprising one or more pictures comprising one or more subpictures according to a rule; wherein the rule specifies that a first subpicture index that identifies a subpicture sequence extracted by a subpicture sub-bitstream extraction process on the bitstream is based on a second subpicture index of layers of the bitstream that have multiple subpictures per picture.

In one example aspect, a method of processing video data is disclosed. The method includes performing a conversion between a video and a bitstream of the video, wherein the bitstream comprises one or more layers comprising one or more sublayers comprising one or more pictures comprising one or more subpictures according to a rule, wherein the rule specifies a rewriting operation selectively performed on one or more syntax structures during a subpicture sub-bitstream extraction process by which an output target sub-bitstream is extracted from the bitstream, wherein the one or more syntax elements include information of the output target sub-bitstream.

In one example aspect, a method of processing video data is disclosed. The method includes performing a conversion between a video and a bitstream of the video, wherein the bitstream comprises one or more layers comprising one or more pictures comprising one or more subpictures according to a rule, wherein the rule specifies, responsive to a condition, a selective processing of a first supplemental enhancement information (SEI) network abstraction layer (NAL) unit of a target output subpicture sub-bitstream that is extracted during a subpicture sub-bitstream extraction process.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

DETAILED DESCRIPTION

Figure 2:
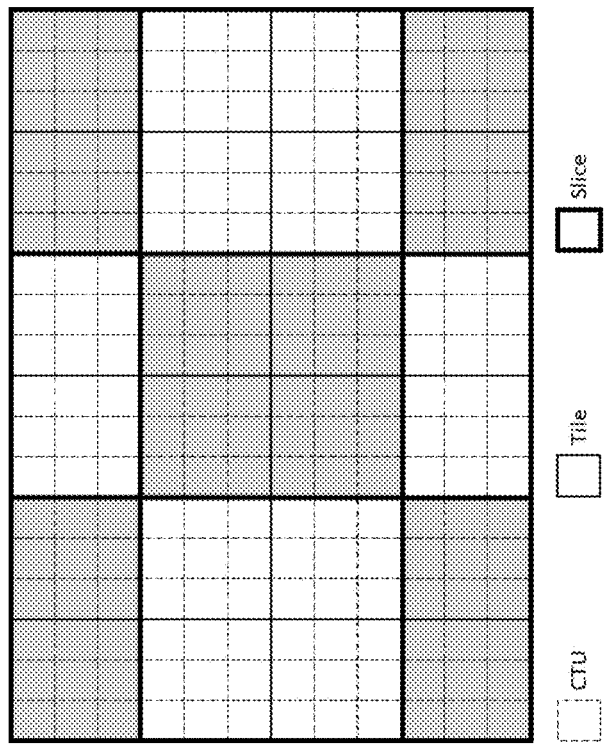
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and highlight indicating added text (including boldface italic), with respect to the current draft of the Versatile Video Coding (VVC) specification.

1. INTRODUCTION

This disclosure is related to video coding technologies. Specifically, it is about specifying and signaling level information for subpicture sequences. It may be applied to any video coding standard or non-standard video codec that supports single-layer video coding and multi-layer video coding, e.g., Versatile Video Coding (VVC) that is being developed.

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Picture
JEM Joint Exploration Model
LTRP Long-Term Reference Picture
MCTS Motion-Constrained Tile Sets
NAL Network Abstraction Layer
NUT NAL Unit Type
OLS Output Layer Set
PH Picture Header
PPS Picture Parameter Set
PTL Profile, Tier and Level
PU Picture Unit
RAP Random Access Point
RBSP Raw Byte Sequence Payload
SEI Supplemental Enhancement Information
SLI Subpicture Level Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the Joint Collaborative Team on Video Coding (JCT-VC) output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
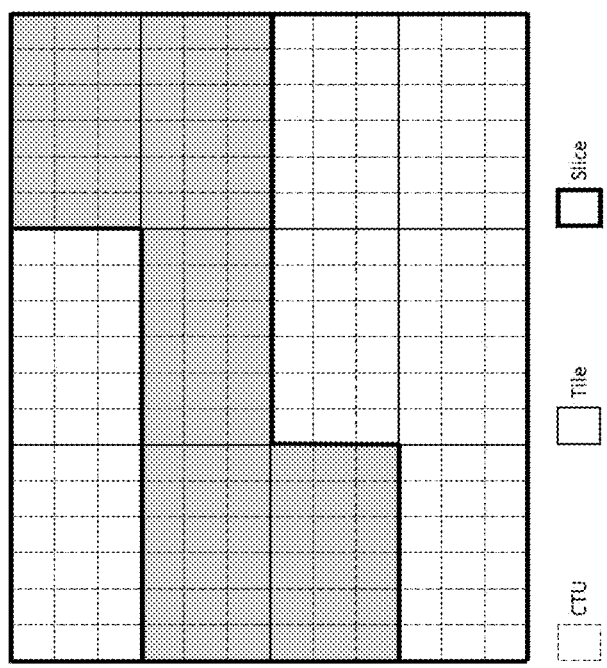
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
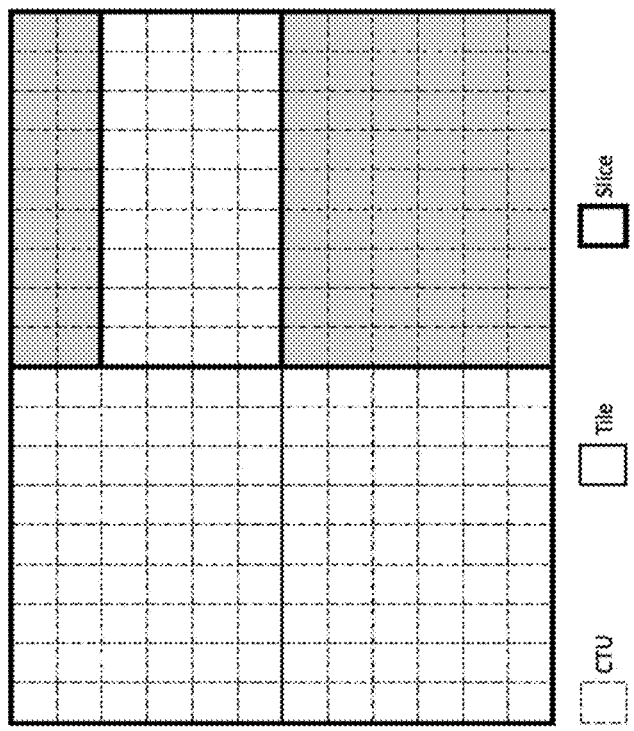
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
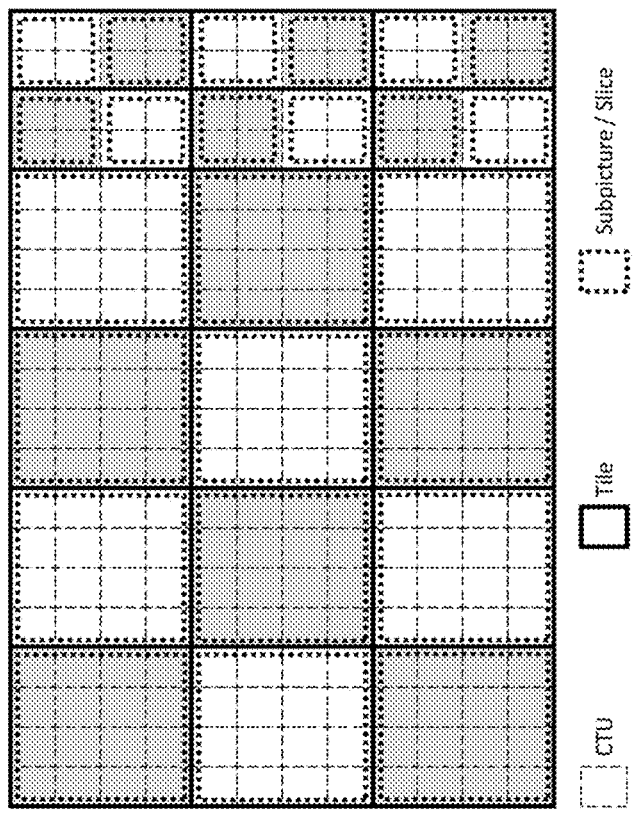
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.5. Viewport-Dependent 360° Video Streaming Based on Subpictures

In streaming of 360° video, a.k.a., omnidirectional video, at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 11:
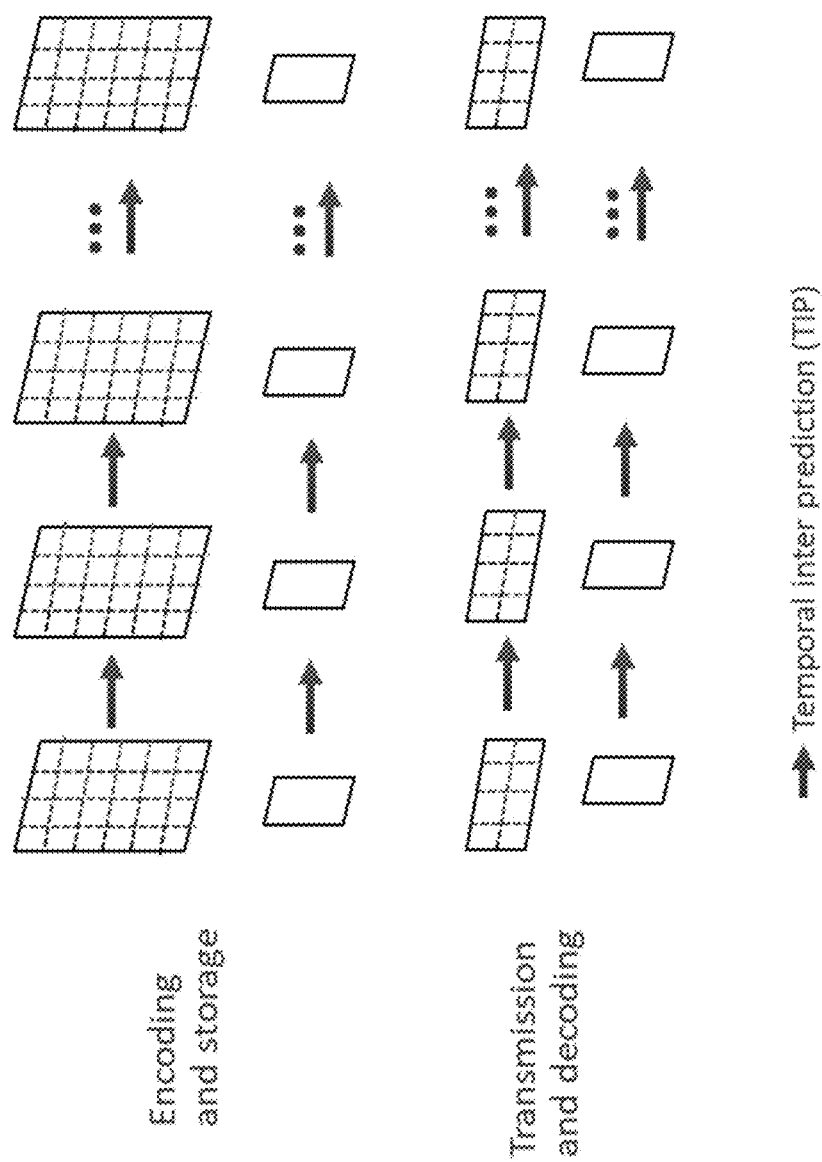
FIG. 11 shows an example of a typical subpicture-based viewport-dependent 360° video coding scheme.

A typical subpicture-based viewport-dependent 360° video delivery scheme is shown in FIG. 11, wherein a higher-resolution representation of the full video consists of subpictures, while a lower-resolution representation of the full video does not use subpictures and can be coded with less frequent random access points than the higher-resolution representation. The client receives the full video in the lower-resolution and for the higher-resolution video it only receives and decode the subpictures that cover the current viewport.

Figure 12:
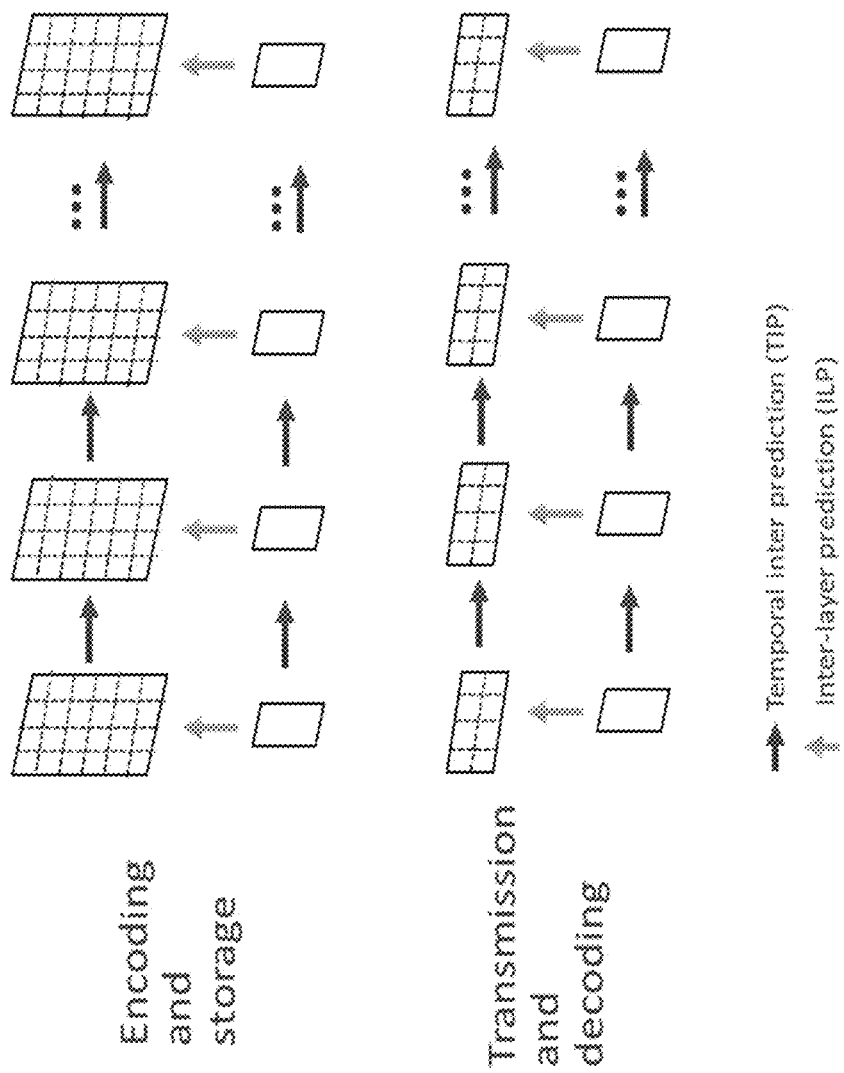
FIG. 12 shows a viewport-dependent 360° video coding scheme based on subpictures and spatial scalability.

The latest VVC draft specification also supports the improved 360° video coding scheme as shown in FIG. 12. The only difference compared to the approach shown in FIG. 11 is that inter-layer prediction (ILP) is applied for the approach shown in FIG. 12.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.7. Subpicture Sub-Bitstream Extraction Process

The subpicture sub-bitstream extraction process in clause C.7 of the latest VVC text plus the proposed changes in Bytedance IDF P2005612001H_v0 is as follows.

C.7 Subpicture Sub-Bitstream Extraction Process

Inputs to this process are a bitstream inBitstream, a target OLS index targetOlsIdx, a target highest TemporalId value tIdTarget, and a list of target subpicture index values subpicIdxTarget[i] for i from 0 to NumLayersInOls[targetOLsIdx]−1, inclusive.

Output of this process is a sub-bitstream outBitstream.

It is a requirement of bitstream conformance for the input bitstream that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS, tIdTarget equal to any value in the range of 0 to vps_max_sublayers_minus1, inclusive, and the list subpicIdxTarget[i] for i from 0 to NumLayersInOls[targetOLsIdx]−1, inclusive, satisfying the following conditions, as inputs:

All layers in the targetOLsIdx-th OLS have the same spatial resolution, the same value for sps_num_subpics_minus1, and the same subpicture layout, and all the subpicture have sps_subpic_treated_as_pic_flag[ ] equal to 1.

The values of subpicIdxTarget[i] for all values of i are identical and equal to a particular value in the range of 0 to sps_num_subpics_minus1, inclusive.

When NumLayersInOls[targetOlsIdx] is greater than 1 and sps_num_subpics_minus1 is greater than 0, a subpicture level information SEI message shall be present in a scalable nesting SEI message with sn_ols_flag equal to 1 and NestingOlsIdx[i] is equal to targetOlsIdx for one value of i in the range of 0 to sn_num_olss_minus1, inclusive.

for use with a multi-layer OLS, an SLI SEI message shall be contained in a scalable nesting SEI message and shall be indicated in the scalable nesting SEI message to apply to specific OLSs or to apply to all layers in specific OLSs.

The output sub-bitstream contains at least one VCL NAL unit with nuh_layer_id equal to each of the nuh_layer_id values in the list LayerIdInOls[targetOlsIdx].

The output sub-bitstream contains at least one VCL NAL unit with Temporand equal to tIdTarget.

NOTE—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls[targetOlsIdx][i] and with sh_subpic_id equal to SubpicIdVal[subpicIdxTarget[i]] for each i in the range of 0 to NumLayersInOls[targetOlsIdx]−1, inclusive.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

For each value of i in the range of 0 to NumLayersInOls[targetOLsIdx]−1, inclusive, remove from outBitstream all VCL NAL units with nuh_layer_id equal to LayerIdInOls[targetOLsIdx][i] and sh_subpic_id not equal to SubpicIdVal[subpicIdxTarget[i]] and their associated filler data NAL units and SEI NAL units that contain filler payload SEI messages.

When sli_cbr_constraint_flag is equal to 0, remove all NAL units with nal_unit_type equal to FD_NUT and SEI NAL units containing filler payload SEI messages.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:

Rewrite the value of general_level_idc in the vps_ols_ptl_idx[targetOlsIdx]-th entry in the list of profile_tier_level( ) syntax structures in all the referenced VPS NAL units to be equal to SubpicSetLevelIdc derived in Equation D.11 for the set of subpictures consisting of the subpictures with subpicture index equal to subpicIdx.

When VCL HRD parameters or NAL HRD parameters are present, rewrite the respective values of cpb_size_value_minus1[tIdTarget][j] and bit_rate_value_minus1[tIdTarget][j] of the j-th CPB in the vps_ols_hrd_idx[MultiLayerOlsIdx[targetOlsIdx]]-th ols_hrd_parameters( ) syntax structure in all the referenced VPS NAL units and in the ols_hrd_parameters( ) syntax structures in all SPS NAL units referred to by the i-th layer, such that they correspond to SubpicCpbSizeVcl[SubpicSetLevelIdx][subpicIdx], and SubpicCpbSizeNal[SubpicSetLevelIdx][subpicIdx] as derived by Equations D.6 and D.7, respectively, SubpicBitrateVcl[SubpicSetLevelIdx][subpicIdx] and SubpicBitrateNal[SubpicSetLevelIdx][subpicIdx] as derived by Equations D.8 and D.9, respectively, where SubpicSetLevelIdx is derived by Equation D.11 for the subpicture with subpicture index equal to subpicIdx, j is in the range of 0 to hrd_cpb_cnt_minus1, inclusive, and i is in the range of 0 to NumLayersInOls[targetOlsIdx]−1, inclusive.

For each value of i in the range of 0 to NumLayersInOls[targetOlsIdx]−1, the following applies.

The variable spIdx is set equal to subpicIdxTarget[i].

Rewrite the value of general_level_idc in the profile_tier_level( ) syntax structure in all the referenced SPS NAL units with sps_ptl_dpb_hrd_params_present_flag equal to 1 to be equal to SubpicSetLevelIdc derived by Equation D.11 for the set of subpictures consisting of the subpicture with subpicture index equal to spIdx.

The variables subpicWidthInLumaSamples and subpicHeightInLumaSamples are derived as follows:

$$
\begin{aligned}
&\text{subpicWidthInLumaSamples} = \min(\,(\,\text{sps\_subpic\_ctu\_top\_left\_x}[\,\text{spIdx}\,] + \\
&\quad \text{sps\_subpic\_width\_minus1}\,[\,\text{spIdx}\,] + 1) * \text{CtbSize Y}, \\
&\quad \text{pps\_pic\_width\_in\_luma\_samples}\,) - \\
&\quad \text{sps\_subpic\_ctu\_top\_left\_x}[\,\text{spIdx}\,] * \text{CtbSize Y} \\
&\text{subpicHeightInLumaSamples} = \min(\,(\,\text{sps\_subpic\_ctu\_top\_left\_y}[\,\text{spIdx}\,] + \\
&\quad \text{sps\_subpic\_height\_minus1}\,[\,\text{spIdx}\,] + 1) * \text{CtbSize Y}, \\
&\quad \text{pps\_pic\_height\_in\_luma\_samples}\,) - \\
&\quad \text{sps\_subpic\_ctu\_top\_left\_y}[\,\text{spIdx}\,] * \text{CtbSize Y}
\end{aligned}
\quad (C.24)(C.25)
$$

Rewrite the values of the sps_pic_width_max_in_luma_samples and sps_pic_height_max_in_luma_samples in all the referenced SPS NAL units and the values of pps_pic_width_in_luma_samples and pps_pic_height_in_luma_samples in all the referenced PPS NAL units to be equal to subpicWidthInLumaSamples and subpicHeightInLumaSamples, respectively.

Rewrite the value of sps_num_subpics_minus1 in all the referenced SPS NAL units and pps_num_subpics_minus1 in all the referenced PPS NAL units to 0.

Rewrite the syntax elements sps_subpic_ctu_top_left_x[spIdx] and sps_subpic_ctu_top_left_y[spIdx], when present, in all the referenced SPS NAL units to 0.

Remove the syntax elements sps_subpic_ctu_top_left_x[j], sps_subpic_ctu_top_left_y[j], sps_subpic_width_minus1[j], sps_subpic_height_minus1[j], sps_subpic_treated_as_pic_flag[j], sps_loop_filter_across_subpic_enabled_flag[j], and sps_subpic_id[j] in all the referenced SPS NAL units and for each j that is not equal to spIdx.

Rewrite the syntax elements in all the referenced PPS for signalling of tiles and slices to remove all tile rows, tile columns, and slices that are not associated with the subpicture with subpicture index equal to spIdx.

The variables subpicConfWinLeftOffset, subpicConfWinRightOffset, subpicConfWinTopOffset and subpicConfWinBottomOffset are derived as follows:

$$
\begin{aligned}
&\text{subpicConfWinLeftOffset} = \text{sps\_subpic\_ctu\_top\_left\_x}[\,\text{spIdx}\,] == 0\,? \\
&\quad \text{sps\_conf\_win\_left\_offset} : 0 \\
&\text{subpicConfWinRightOffset} = (\,\text{sps\_subpic\_ctu\_top\_left\_x}[\,\text{spIdx}\,] + \\
&\quad \text{sps\_subpic\_width\_minus1}[\,\text{spIdx}\,] + 1\,) * \text{CtbSizeY} >= \\
&\quad \text{sps\_pic\_width\_max\_in\_luma\_samples}\,?\,\text{sps\_conf\_win\_right\_offset} : 0 \\
&\text{subpicConfWinTopOffset} = \text{sps\_subpic\_ctu\_top\_left\_y}[\,\text{spIdx}\,] == 0\,? \\
&\quad \text{sps\_conf\_win\_top\_offset} : 0 \\
&\text{subpicConfWinBottomOffset} = (\,\text{sps\_subpic\_ctu\_top\_left\_y}[\,\text{spIdx}\,] + \\
&\quad \text{sps\_subpic\_height\_minus1}[\,\text{spIdx}\,] + 1\,) * \text{CtbSizeY} >= \\
&\quad \text{sps\_pic\_height\_max\_in\_luma\_samples}\,?\,\text{sps\_conf\_win\_bottom\_offset} : 0
\end{aligned}
\quad (C.26)(C.27)(C.28)(C.29)
$$

Where sps_subpic_ctu_top_left_x[spIdx], sps_subpic_width_minus[spIdx], sps_subpic_ctu_top_left_y[spIdx], sps_subpic_height_minus1[spIdx], sps_pic_width_max_in_luma_samples, sps_pic_height_max_in_luma_samples, sps_conf_win_left_offset, sps_conf_win_right_offset, sps_conf_win_top_offset, and sps_conf_win_bottom_offset in the above equations are from the original SPSs before they were rewritten.

Rewrite the values of sps_conf_win_left_offset, sps_conf_win_right_offset, sps_conf_win_top_offset, and sps_conf_win_bottom_offset in all the referenced SPS NAL units and the values of pps_conf_win_left_offset, pps_conf_win_right_offset, pps_conf_win_top_offset, and pps_conf_win_bottom_offset in all the referenced PPS NAL units to be equal to subpicConfWinLeftOffset, subpicConfWinRightOffset, subpicConfWinTopOffset, and subpicConfWinBottomOffset, respectively.

The variables subpicScalWinLeftOffset, subpicScalWinRightOffset, subpicScalWinTopOffset and subpicScalWinBotOffset are derived as follows:

```
subpicScalWinLeftOffset = pps_scaling_win_left_offset −   (C.30)
    sps_subpic_ctu_top_left_x[ spIdx ] * CtbSize Y / SubWidthC
rightSubpicBd = ( sps_subpic_ctu_top_left_x[ spIdx ] +
    sps_subpic_width_minus1 [ spIdx ] + 1) * CtbSize Y
subpicScalWinRightOffset = ( rightSubpicBd >= sps_pic_width_max_in_luma_samples ) ?
    pps_scaling_win_right_offset : pps_scaling_win_right_offset −        (C.31)
    ( sps_pic_width_max_in_luma_samples − rightSubpicBd ) / Sub WidthC
subpicScalWinTopOffset = pps_scaling_win_top_offset −  (C.32)
    sps_subpic_ctu_top_left_y[ spIdx ] * CtbSize Y / SubHeightC
botSubpicBd = ( sps_subpic_ctu_top_left_y[ spIdx ] +
    sps_subpic_height_minus1 [ spIdx ] + 1) * CtbSize Y
subpicScalWinBotOffset = ( botSubpicBd >= sps_pic_height_max_in_luma_samples ) ?
    (C.33)
    pps_scaling_win_bottom_offset : pps_scaling_win_bottom_offset −
    ( sps_pic_height_max_in_luma_samples − botSubpicBd ) / SubHeightC
```

Where sps_subpic_ctu_top_left_x[spIdx], sps_subpic_width_minus1[spIdx], sps_subpic_ctu_top_left_y[spIdx], sps_subpic_height_minus1[spIdx], sps_pic_width_max_in_luma_samples, and sps_pic_height_max_in_luma_samples in the above equations are from the original SPSs before they were rewritten, and pps_scaling_win_left_offset, pps_scaling_win_right_offset, pps_scaling_win_top_offset, and pps_scaling_win_bottom_offset in the above are from the original PPSs before they were rewritten.

Rewrite the values of pps_scaling_win_left_offset, pps_scaling_win_right_offset, pps_scaling_win_top_offset, and pps_scaling_win_bottom_offset in all the referenced PPS NAL units to be equal to subpicScalWinLeftOffset, subpicScalWinRightOffset, subpicScalWinTopOffset, and subpicScalWinBotOffset, respectively.

If sli_cbr_constraint_flag is equal to 1, set cbr_flag[tIdTarget][j] equal to 1 of the j-th CPB in the vps_ols_hrd_idx[MultiLayerOlsIdx[targetOlsIdx]]-th ols_hrd_parameters( ) syntax structure in all the referenced VPS NAL units and SPS NAL units and j in the range of 0 to hrd_cpb_cnt_minus1. Otherwise (sli_cbr_constraint_flag is equal to 0), set cbr_flag[tIdTarget][j] equal to 0.

When outBitstream contains SEI NAL units that contain a scalable nesting SEI message with sn_ols_flag equal to 1 and sn_subpic_flag equal to 1 that are applicable to outBitstream, extract appropriate non-scalable-nested SEI message with payloadType equal to 1 (PT), 130 (DUI), or 132 (decoded picture hash) from the scalable nesting SEI message and place the extracted SEI messages into outBitstream.

4. TECHNICAL PROBLEMS SOLVED BY DISCLOSED TECHNICAL SOLUTIONS

The latest design of the subpicture sub-bitstream extraction process has the following problems:

1) SEI NAL units containing scalable-nested SEI messages in scalable nesting SEI messages with sn_subpic_flag equal to 1 that do not apply to the output bitstream should be removed from the output bitstream.
2) The subpicture index for identifying the subpicture sequence should be the subpicture index of the to-be-extracted subpictures in layers with multiple subpictures per picture, not the layers with only one subpicture per picture.
3) Rewriting of sublayer_level_idc[k] for k in the range of 0 to tIdTarget−1, inclusive, is missing, and it is not clearly specified under which condition rewriting of level information should be performed to the referenced VPSs and/or the referenced SPSs.
4) Rewriting of cpb_size_value_minus1[k][j] and bit_rate_value_minus1[k][j] for k in the range of 0 to tIdTarget−1, inclusive, is missing, and it is not clearly specified under which condition rewriting of the CPB size and bit rate information should be performed to the referenced VPSs and/or the referenced SPSs.
5) It is not clearly specified under which condition rewriting of the cbr_flag[tIdTarget][j] should be performed to the referenced VPSs and/or the referenced SPSs.
6) The last step that makes scalable-nested SEI messages to be non-scalable-nested SEI messages has multiple issues:
   a. When a decoded picture hash SEI message is contained in a scalable nesting SEI message, the value of sn_ols_flag needs to be equal to 0, while the current text of the last step assumes sn_ols_flag equal to 1.
   b. SLI and BP SEI messages in the case with sn_ols_flag equal to 1 and sn_subpic_flag equal to 1 are not covered.
   c. SEI messages in the case with sn_ols_flag equal to 0 and sn_subpic_flag equal to 1 are not covered.
   d. Where the resulting non-scalable-nested SEI messages should be placed (in which SEI NAL unit, where the SEI NAL unit should be) in the output bitstream is unspecified.
   e. The original container SEI NAL units should be removed from the output bitstream.

5. A LISTING OF SOLUTIONS AND EMBODIMENTS

To solve the above problems, and others, methods as summarized below are disclosed. The solution items should be considered as examples to explain the general concepts and should not be interpreted in a narrow way. Furthermore, these items can be applied individually or combined in any manner.

1) To solve problem 1, in the subpicture sub-bitstream extraction process, it may be specified that SEI NAL units containing scalable-nested SEI messages that do not apply to the output bitstream are removed from the output bitstream.
2) To solve problem 2, in the subpicture sub-bitstream extraction process, the following may be specified: the subpicture index for identifying the subpicture sequence is specified as the subpicture index of the to-be-extracted subpictures in the layers with multiple subpictures per picture, not the layers with only one subpicture per picture.

3) To solve problem 3, in the subpicture sub-bitstream extraction process, the following may be specified: rewrite both general_level_idc and sublayer_level_idc [k] for k in the range of 0 to tIdTarget−1, inclusive, to appropriate values (e.g., as described in the present disclosure), in the referenced VPSs, when present, and in the referenced SPSs, when NumLayersInOls[targetOLsIdx] is equal to 0.

4) To solve problem 4, in the subpicture sub-bitstream extraction process, the following may be specified: rewrite cpb_size_value_minus1[k][j] and bit_rate_value_minus1[k][j] for all values of k in the range of 0 to tIdTarget, inclusive, to appropriate values (e.g., as described in the present disclosure), in the referenced VPSs, when present, and in the referenced SPSs, when NumLayersInOls[targetOLsIdx] is equal to 0.

5) To solve problem 5, in the subpicture sub-bitstream extraction process, the following may be specified: rewrite cbr_flag[tIdTarget][j] in the referenced VPSs, when present, to appropriate values (e.g., as described in the present disclosure), and in the referenced SPSs, when NumLayersInOls[targetOLsIdx] is equal to 0.

6) To solve problem 6, under certain condition, one or more of the following operations may be performed:
   a. Generate a new SEI NAL unit seiNalUnitB.
   b. Include seiNalUnitB in the PU containing seiNalUnitA.
   c. Include seiNalUnitB in the PU containing seiNalUnitA immediately after seiNalUnitA.
   d. Extract the scalable-nested SEI messages from the scalable nesting SEI message and include them directly in seiNalUnitB (as non-scalable-nested SEI messages).
   e. Remove seiNalUnitA from outBitstream.

7) In one example, the certain condition in item 6) is as follows: when outBitstream contains an SEI NAL unit seiNalUnitA that contains a scalable nesting SEI message with sn_subpic_flag equal to 1 that are applicable to the OLSs (when sn_ols_flag is equal to 1) or the layers (when sn_ols_flag is equal to 0) that have exactly the same set of layers as in outBitstream and are applicable to the subpictures that have the same set of subpictures as in outBitstream.

8) In one example, in the subpicture sub-bitstream extraction process, when LayerIdInOls[targetOlsIdx] does not include all values of nuh_layer_id in all NAL units in the bitstream, and the outBitstream contains an SEI NAL unit seiNalUnitA that contains a scalable nesting SEI message, keep seiNalUnitA in the output bitstream.

6. EMBODIMENTS

Below are some example embodiments for some of the aspects summarized above in Section 5, which can be applied to the VVC specification. The changed texts are based on the latest VVC text in JVET-S0152-v5. Most relevant parts that have been added or modified are highlighted in underlined boldface, and some of the deleted parts are highlighted in [[italicized double-bracket text]]. There may be some other changes that are editorial in nature and thus not highlighted.

6.1. First Embodiment

This embodiment is for items 1 to 7 and their sub-items.
C.7 Subpicture Sub-Bitstream Extraction Process Inputs to this process are a bitstream inBitstream, a target OLS index targetOlsIdx, a target highest TemporalId value tIdTarget, and [[an array]] a list of target subpicture index values [[for each layer]] subpicIdxTarget[i] for i from 0 to NumLayersInOls[targetOLsIdx]−1, inclusive.

Output of this process is a sub-bitstream outBitstream.

The OLS with OLS index targetOlsIdx Is referred to as the target OLS. Among the layers in the target OLS, those for which the referenced SPSs have sps_num_subpics_minus1 greater than 0 are referred to as the multiSubLayers.

It is a requirement of bitstream conformance for the input bitstream that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS, tIdTarget equal to any value in the range of 0 to vps_max_sublayers_minus1, inclusive, and the list subpicIdxTarget[i][[equal to a subpicture index present in the OLS, as inputs.]] for i from 0 to NumLayersInOls[targetOLsIdx]−1, inclusive, satisfying the following conditions, as inputs:

The value of subpicIdxTarget[i] is equal to a value in the range of 0 to sps_num_subpics_minus1, inclusive, such that sps_subpic_treated_as_pic_flag[subpicIdxTarget[i]] is equal to 1, where sps_num_subpics_minus1 and sps_subpic_treated_as_pic_flag[subpicIdxTarget[i]] are found in or inferred based on the SPS referred to by the layer with nuh_layer_id equal to LayerIdInOls[targetOLsIdx][i].

NOTE 1—When the sps_num_subpics_minus1 for the layer with nuh_layer_id equal to LayerIdInOls[_targetOLsIdx][i] is equal to 0, the value of subpicIdxTarget[i] is always equal to 0.

For any two different integer values of m and n, when sps_num_subpics_minus1 is greater than 0 for both layers with nuh_layer_id equal to LayerIdInOls[targetOLsIdx][m] and LayerIdInOls[targetOLsIdx][n], respectively, subpicIdxTarget[m] is equal to subpicIdxTarget[n].

The output sub-bitstream contains at least one VCL NAL unit with nuh_layer_id equal to each of the nuh_layer_id values in list LayerIdInOls[targetOlsIdx].

The output sub-bitstream contains at least one VCL NAL unit with TemporalId equal to tIdTarget.

NOTE 2—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls[targetOlsIdx][i] and with sh_subpic_id equal to [[the value in]] SubpicIdVal[subpicIdxTarget[i]] for each i in the range of 0 to NumLayersInOls[targetOlsIdx]−1, inclusive.

The output sub-bitstream outBitstream is derived by the following order steps [[as follows]]:
1. The sub-bitstream extraction process, specified in Annex C.6, is invoked with inBitstream, targetOlsIdx, and tIdTarget as inputs and the output of the process is assigned to outBitstream.
2. For each value of i in the range of 0 to NumLayersInOls[targetOLsIdx]−1, inclusive, remove from outBitstream all VCL NAL units with nuh_layer_id equal to LayerIdInOls[targetOLsIdx][i] and sh_subpic_id not equal to SubpicIdVal[subpicIdxTarget[i]], their associated filler data NAL units, and their associated SEI NAL units that contain filler payload SEI messages.

3. When sli_cbr_constraint_flag of the SLI SEI message that apples to the target OLS is equal to 0, remove all NAL units with nal_unit_type equal to FD NUT and SEI NAL units containing filler payload SEI messages.

4. Remove from outBitstream all SEI NAL units that contain scalable nesting SEI messages with sn_subpic_flag equal to 1 and none of the sn_subpic_idx[j] values for j from 0 to sn_num_subpics_minus1, inclusive, is equal to any of the subpicIdxTarget[i] values for the layers in the multiSubpikLayers.

5. If some external means not specified in this Specification is available to provide replacement parameter sets for the sub-bitstream outBitstream, replace all parameter sets with the replacement parameter sets. Otherwise, when SLI SEI messages are present in inBitstream, the following ordered steps apply[[applies]]:

[[SubpicLevelIdx]]][spIdx[[subpicIdx]]][k], and SubpicCpbSizeNal[spLvIdx[[SubpicLevelIdx]]] [spIdx[[subpicIdx]]][k] as derived by Equations D.6 and D.7, respectively, SubpicBitrateVcl[spLvIdx [[SubpicLevelIdx]]][spIdx[[subpicIdx]]][k] and SubpicBitrateNal[spLvIdx[[SubpicLevelIdx]]] [spIdx[[subpicIdx]]][k] as derived by Equations D.8 and D.9, respectively, where [[SubpicLevelIdx is derived by Equation D.10 for the subpicture with subpicture index equal to subpicIdx,]] j is in the range of 0 to hrd_cpb_cnt_minus1, inclusive, and i is in the range of 0 to NumLayersInOls[targetOlsIdx]−1, inclusive.

d. For each layer in the multiSubpicLayers[[the i-th layer with i in the range of 0 to NumLayersInOls [targetOlsIdx]−1]], the following ordered steps apply [[applies]] for rewriting of the SPSs and PPSs referenced by Pictures in that layer:

i. The variables subpicWidthInLumaSamples and subpicHeightInLumaSamples are derived as follows:

$$\begin{aligned}
&\text{subpicWidthInLumaSamples} = \min(\ (\text{sps\_subpic\_ctu\_top\_left\_x}[\ \mathbf{spIdx}[[\text{subpicIdx}]]\ ]\ + \\
&\quad (\text{C.24}) \\
&\quad \text{sps\_subpic\_width\_minus}1\ [\ \mathbf{spIdx}[[\text{subpicIdx}]]\ ]\ +\ 1\ )\ *\ \text{CtbSize Y}, \\
&\quad \text{pps\_pic\_width\_in\_luma\_samples}\ )\ - \\
&\quad \text{sps\_subpic\_ctu\_top\_left\_x}[\ \text{s}\ \mathbf{spIdx}[[\text{subpicIdx}]]\ ]\ *\ \text{CtbSize Y} \\
&\text{subpicHeightInLumaSamples} = \min(\ (\text{sps\_subpic\_ctu\_top\_left\_y}[\ \mathbf{spIdx}[[\text{subpicIdx}]]\ ]\ + \\
&\quad (\text{C.25}) \\
&\quad \text{sps\_subpic\_height\_minus}1\ [\ \mathbf{spIdx}[[\text{subpicIdx}]]\ ]\ +\ 1)\ *\ \text{CtbSizeY}, \\
&\quad \text{pps\_pic\_height\_in\_luma\_samples}\ )\ - \\
&\quad \text{sps\_subpic\_ctu\_top\_left\_y}[\ \mathbf{spIdx}[[\text{subpicIdx}]]\ ]\ *\ \text{CtbSize Y}
\end{aligned}$$

a. The variable [[subpicIdx]]spIdx is set equal to the value of [[subpicIdxTarget[[NumLayersInOls[targetOlsIdx]−1]]]]subpicIdxTarget[i] for any layer in the multiSubpicLayers.

b. Rewrite the values of general_level_idc and sublayer_level_idc[k] for k in the range of 0 to tIdTarget−1, inclusive, in the vps_ols_ptl_idx[targetOlsIdx]-th entry in the list of profile_tier_level( ) syntax structures in all the referenced VPS NAL units, when present, and in the profile_tier_level( ) syntax structure in all the referenced SPS NAL units, when NumLayersInOls[targetOLsIdx] is equal to 0, to be equal to SubpicLevelIdc[spIdx][tIdTarget] and SubpiclevelIdc[spIdx][k], respectively, derived in Equation D.10 for the spIdx-th subpicture sequence[[set of subpictures consisting of the subpictures with subpicture index equal to subpicIdx]].

c. For k in the range of 0 to tIdTarget, inclusive, let spLvIdx be set equal to SubpicLevelIdx[spIdx][k], where SubpicLevelIdx[spIdx][k] is derived by Equation D.10 for the spIdx-th subpicture sequence. When VCL HRD parameters or NAL HRD parameters are present, for k in the range of 0 to tIdTarget, inclusive, rewrite the respective values of cpb_size_value_minus1[k[[tIdTarget]]][j] and bit_rate_value_minus1[k[[tIdTarget]]][j] of the j-th CPB in the vps_ols_hrd_idx[MultiLayerOlsIdx [targetOlsIdx]]-th ols_hrd_parameters( ) syntax structure in all the referenced VPS NAL units, when present, and in the ols_hrd_parameters( ) syntax structures in all the referenced SPS NAL units [[referred to by the i-th layer]], when NumLayersInOls [targetOLsIdx] Is equal to 0, such that they correspond to SubpicCpbSizeVcl[spLvIdx ii. Rewrite the values of the sps_pic_width_max_in_luma_samples and sps_pic_height_max_in_luma_samples in all the referenced SPS NAL units and the values of pps_pic_width_in_luma_samples and pps_pic_height_in_luma_samples in all the referenced PPS NAL units to be equal to subpicWidthInLumaSamples and subpicHeightInLumaSamples, respectively.

iii. Rewrite the value of sps_num_subpics_minus1 in all the referenced SPS NAL units and pps_num_subpics_minus1 in all the referenced PPS NAL units to 0.

iv. Rewrite the syntax elements sps_subpic_ctu_top_left_x[spIdx[[subpicIdx]]] and sps_subpic_ctu_top_left_y[spIdx[[subpicIdx]]], when present, in all the referenced SPS NAL units to 0.

v. Remove the syntax elements sps_subpic_ctu_top_left_x[j], sps_subpic_ctu_top_left_y[j], sps_subpic_width_minus1[j], sps_subpic_height_minus1[j], sps_subpic_treated_as_pic_flag[j], sps_loop_filter_across_subpic_enabled_flag[j], and sps_subpic_id[j] in all the referenced SPS NAL units and for each j that is not equal to spIdx[[subpicIdx]].

vi. Rewrite the syntax elements in all the referenced PPS for signalling of tiles and slices to remove all tile rows, tile columns, and slices that are not associated with the subpicture with subpicture index equal to spIdx[[subpicIdx]].

vii. The variables subpicConfWinLeftOffset, subpicConfWinRightOffset, subpicConfWinTopOffset and subpicConfWinBottomOffset are derived as follows:

subpicConfWinLeftOffset = sps_subpic_ctu_top_left_x[ spIdx[[subpicIdx] ] = = 0 ? (C.26)
  sps_conf_win_left_offset : 0
subpicConfWinRightOffset = ( sps_subpic_ctu_top_left_x[ spIdx[[subpicIdx]] ] + (C.27)
  sps_subpic_width_minus1 [ spIdx[[subpicIdx]] ] + 1 ) * CtbSize Y >=
  sps_pic_width_max_in_luma_samples ? sps_conf_win_right_offset : 0
subpicConfWinTopOffset = sps_subpic_ctu_top_left_y[ spIdx[[subpicIdx]] ] = = 0 ? (C.28)
  sps_conf_win_top_offset : 0
subpicConfWinBottomOffset = ( sps_subpic_ctu_top_left_y[ spIdx[[subpicIdx]] ] + (C.29)
  sps_subpic_height_minus 1 [ spIdx[[subpicIdx]] ] + 1 ) * CtbSize Y >=
  sps_pic_height_max_in_luma_samples ? sps_conf_win_bottom_offset : 0

Where sps_subpic_ctu_top_left_x[spIdx], sps_subpic_width_minus1[spIdx], sps_subpic_ctu_top_left_y[spIdx], sps_subpic_height_minus1[spIdx], sps_pic_width_max_in_luma_samples, sps_pic_height_max_in_luma_samples, sps_conf_win_left_offset, sps_conf_win_right_offset, sps_conf_win_top_offset, and sps_conf_win_bottom_offset in the above equations are from the original SPSs before they were rewritten.

NOTE 3—For pictures in the layers in the multiSubpicLayers in both the input bitstream and the output bitstream, the values of sps_pic_width_max_in_luma_samples and sps_pic_height_max_in_luma_samples are equal to pps_pic_width_in_luma_samples and pps_pic_height_in_luma_samples, respectively. Thus in the above equations, sps_pic_width_max_in_luma_samples and sps_pic_height_max_in_luma_samples can be replaced with pps_pic_width_in_luma_samples and pps_pic_height_in_luma_samples, respectively.

viii. Rewrite the values of sps_conf_win_left_offset, sps_conf_win_right_offset, sps_conf_win_top_offset, and sps_conf_win_bottom_offset in all the referenced SPS NAL units and the values of pps_conf_win_left_offset, pps_conf_win_right_offset, pps_conf_win_top_offset, and pps_conf_win_bottom_offset in all the referenced PPS NAL units to be equal to subpicConfWinLeftOffset, subpicConfWinRightOffset, subpicConfWinTopOffset, and subpicConfWinBottomOffset, respectively.

ix. The variables subpicScalWinLeftOffset, subpicScalWinRightOffset, subpicScalWinTopOffset and subpicScalWinBotOffset are derived as follows:

Where sps_subpic_ctu_top_left_x[spIdx], sps_subpic_width_minus1[spIdx], sps_subpic_ctu_top_left_y[spIdx], sps_subpic_height_minus1[spIdx], sps_pic_width_max_in_luma_samples, and sps_pic_height_max_in_luma_samples in the above equations are from the original SPSs before they were rewritten, and pps_scaling_win_left_offset, pps_scaling_win_right_offset, pps_scaling_win_top_offset, and pps_scaling_win_bottom_offset in the above are from the original PPSs before they were rewitten.

x. Rewrite the values of pps_scaling_win_left_offset, pps_scaling_win_right_offset, pps_scaling_win_top_offset, and pps_scaling_win_bottom_offset in all the referenced PPS NAL units to be equal to subpicScalWinLeftOffset, subpicScalWinRightOffset, subpicScalWinTopOffset and subpicScalWinBotOffset, respectively.

[[—Remove from outBitstream all VCL NAL units with nuh_layer_id equal to the nuh_layer_id of the i-th layer and with sh_subpic_id not equal to SubpicIdVal[subpicIdx].]]

e. [[When]] If sli_cbr_constraint_flag is equal to 1. [[remove all NAL units with nal_unit_type equal to FD_NUT and filler payload SEI messages that are not associated with the VCL NAL units of a subpicture in subpicIdTarget[ ] and]]set cbr_flag[tIdTarget] [j] equal to 1 of the j-th CPB in the vps_ols_hrd_idx [MultiLayerOlsIdx[targetOlsIdx]]-th ols_hrd_parameters( ) syntax structure in all the referenced VPS NAL units, when present, and in all the referenced SPS NAL units, when NumLayersInOls[targetOLsIdx] is equal to 0 [[and j in the range of 0 to hrd_cpb_cnt_minus1]]. Otherwise[[,]] (sli_cbr_constraint_flag is equal to 0). [[remove al NAL units with nal_unit_type equal to FD_NUT and filler payload SEI messages and]]set cbr_flag[tIdTar- subpicScalWinLeftOffset = pps_scaling_win_left_offset − (C.30)
  **sps_subpic_ctu_top_left_x[ spIdx ] * CtbSizeY / Sub WidthC**
rightSubpicBd = ( sps_subpic_ctu_top_left_x[ spIdx ] +
  **sps_subpic_width_minus1[ spIdx ] + 1) * CtbSizeY**
subpicScalWinRightOffset = ( rightSubpicBd >= sps_pic_width_max_in_luma_samples )
?
  pps_scaling_win_right_offset : pps_scaling_win_right_offset − (C.31)
  ( sps_pic_width_max_in_luma_samples − rightSubpicBd ) / SubWidthC
subpicScalWinTopOffset = pps_scaling_win_top_offset − (C.32)
  **sps_subpic_ctu_top_left_y[ spIdx ] * CtbSizeY / SubHeightC**
botSubpicBd = ( sps_subpic_ctu_top_left_y[ spIdx ] +
  **sps_subpic_height_minus1[ spIdx ] + 1) * CtbSizeY**
subpicScalWinBotOffset = ( botSubpicBd >= sps_pic_height_max_in_luma_samples ) ?
  (C.33)
  pps_scaling_win_bottom_offset : pps_scaling_win_bottom_offset −
  ( sps_pic_height_max_in_luma_samples − botSubpicBd ) / SubHeightC get][j] equal to 0. In both cases, j is in the range of 0 to hrd_cpb_cnt_minus1, inclusive.

6. When outBitstream contains an SEI NAL unit selNalUnitA that contains a scalable nesting SEI message with sn_subpic_flag equal to 1 that are applicable to the OLSs (when sn_ols_flag is equal to 1) or the layers (when sn_ols_flag is equal to 0) that have exactly the same set of layers as in outBitstream and are applicable to the subpictures that have the same set of subpictures as in outBitstream, generate a new SEI NAL unit seiNalUnitB, include it in the PU containing seiNalUnitA immediately after selNalUnitA, extract the scalable-nested SEI messages from the scalable nesting SEI message and include them directly in seiNalUnitB (as non-scalable-nested SEI messages), and remove selNalUnitA from outBitstream. [[When outBitstream contains SEI NAL units that contain a scalable nesting SEI message with sn_ols_flag equal to 1 and sn_subpic_flag equal to 1 that are applicable to outBitstream, extract appropriate non-scalable-nested SEI message with payloadType equal to 1 (PT), 130 (DUI), or 132 (decoded picture hash) from the scalable nesting SEI message and place die extracted SEI messages into outBitstream.]]

Figure 5:
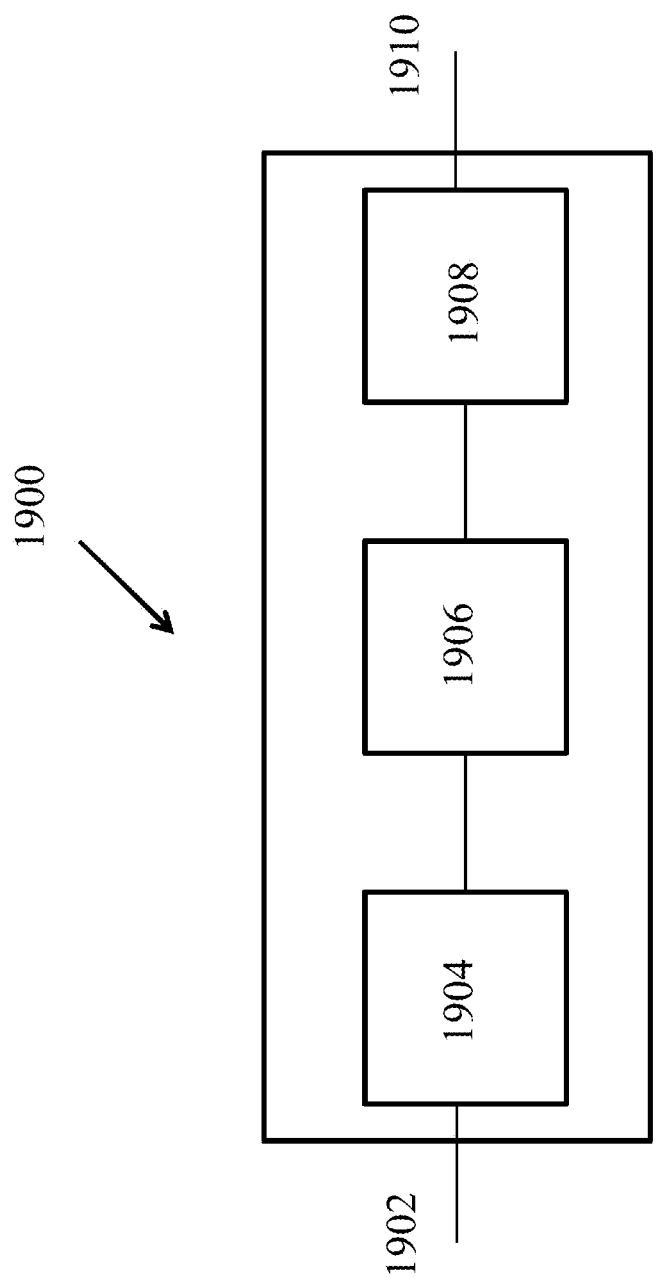
FIG. 5 is a block diagram of an example video processing system.

FIG. 5 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 6:
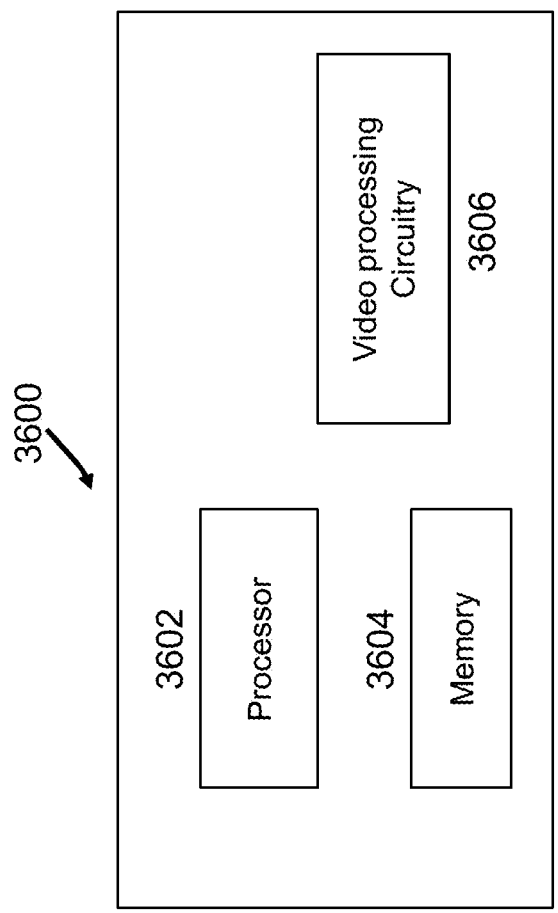
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 8:
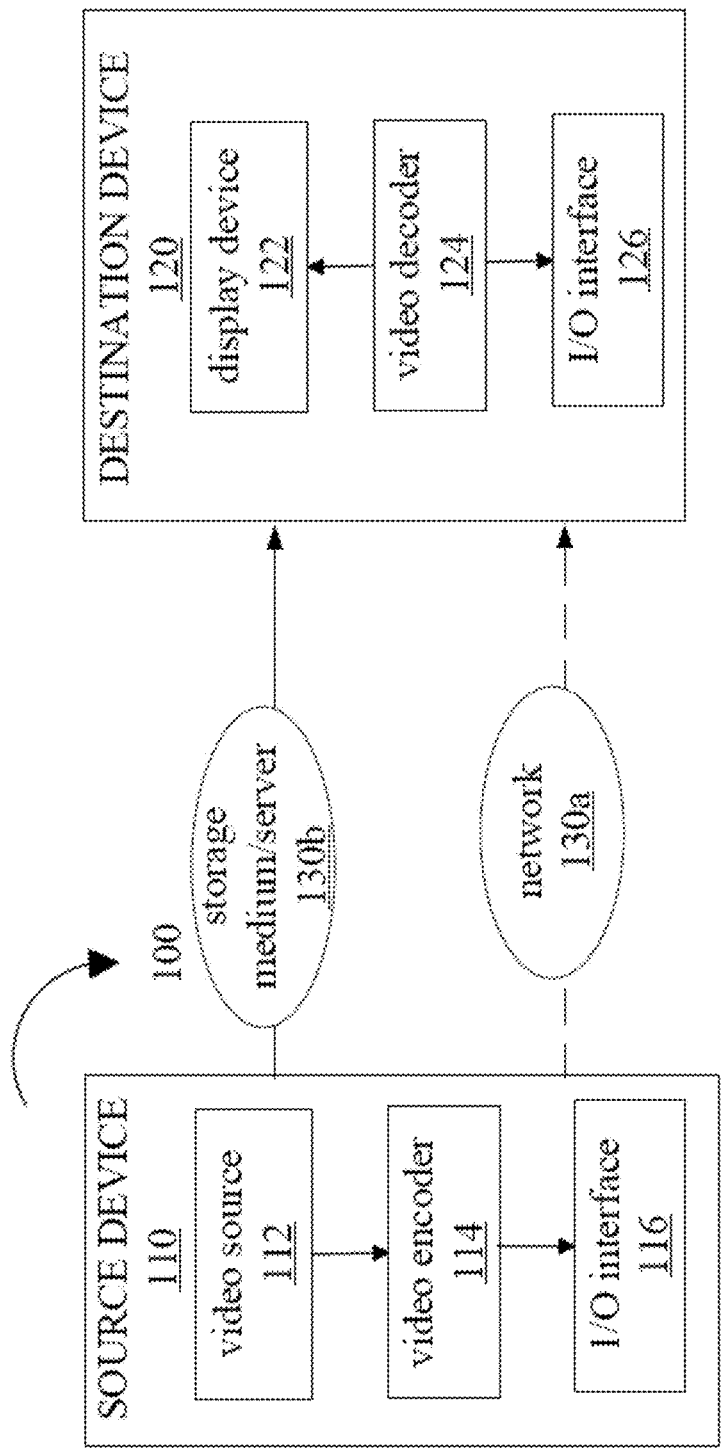
FIG. 8 is a block diagram that illustrates a video coding system in accordance with some embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 9:
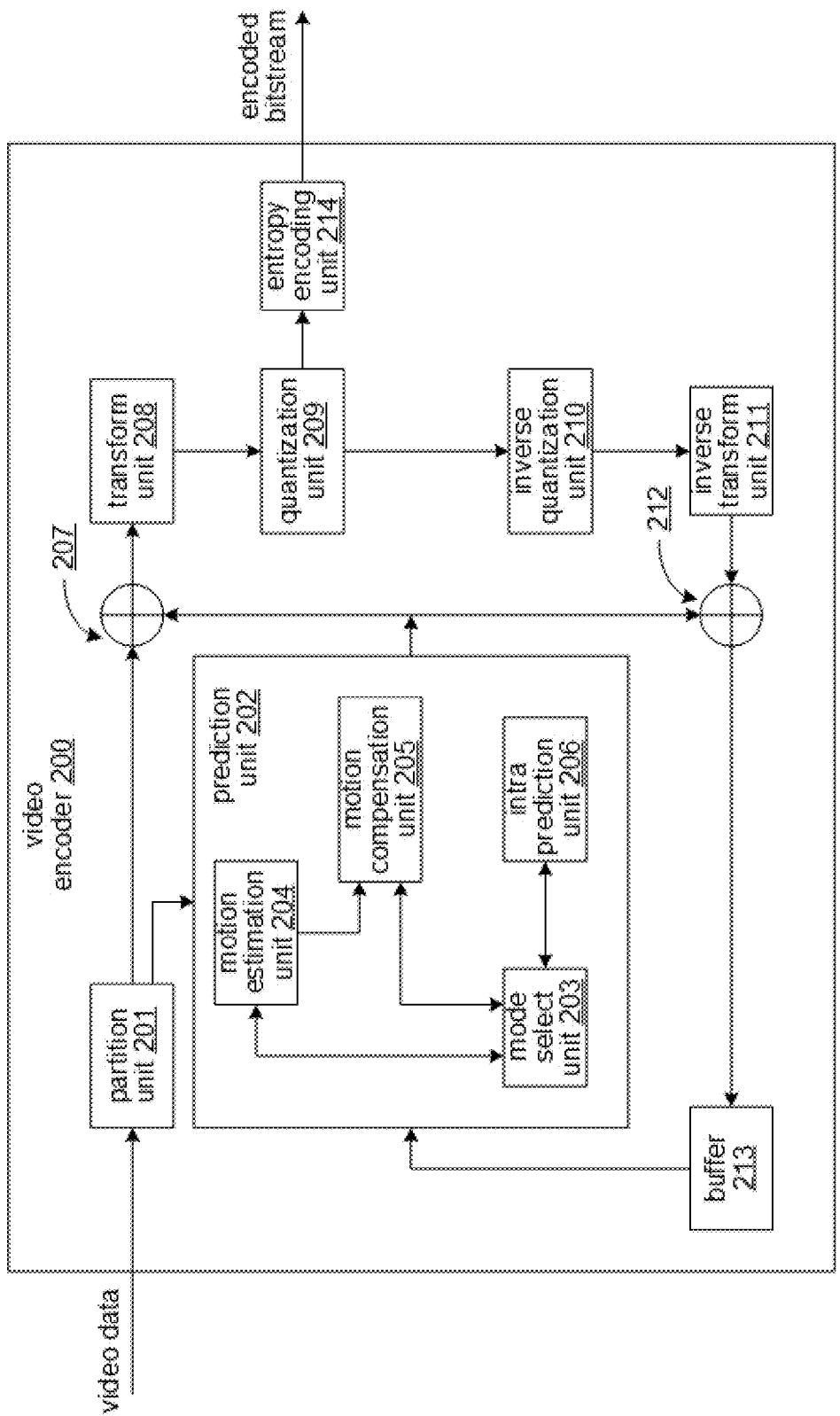
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CUP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
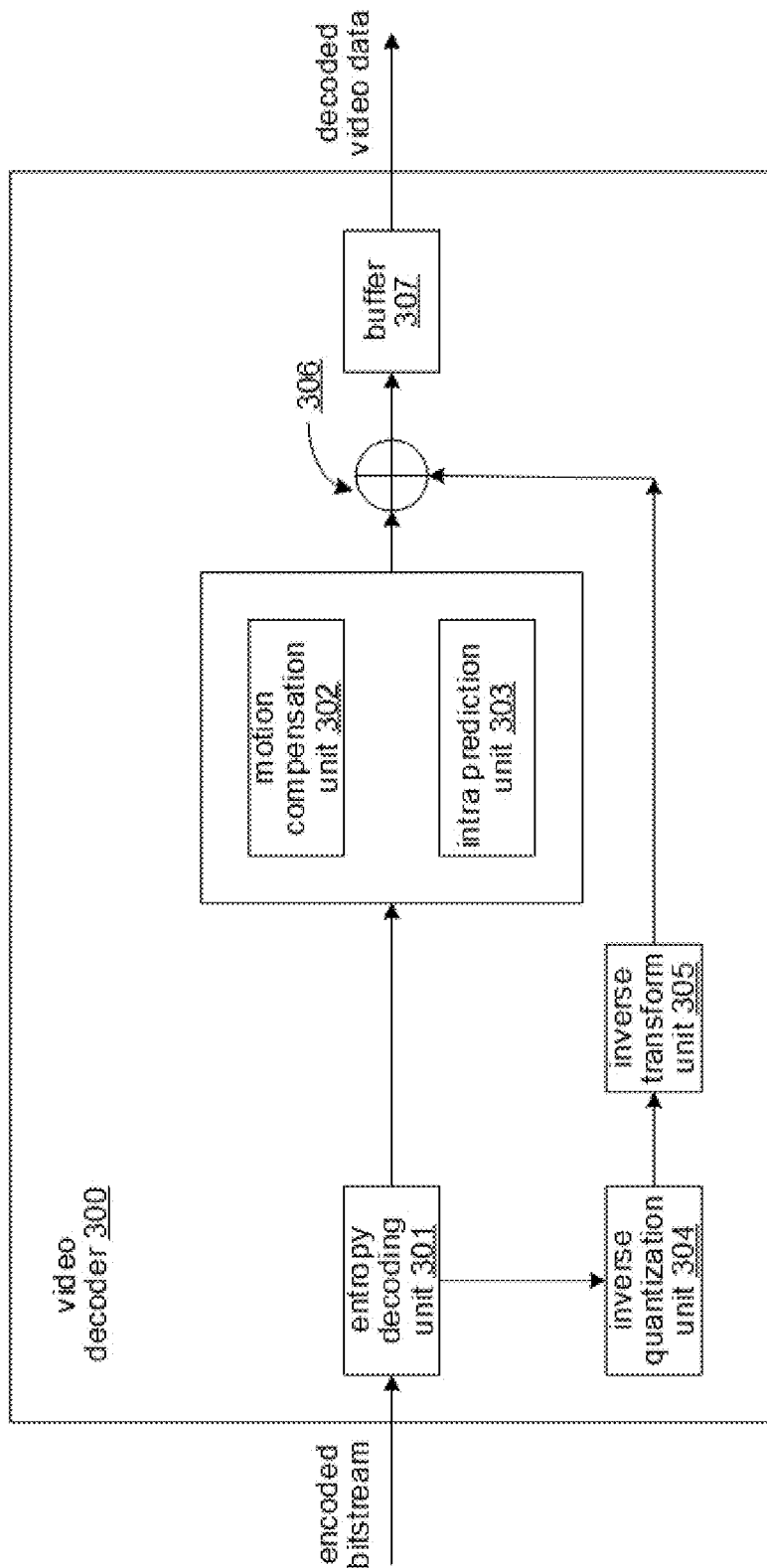
FIG. 10 is a block diagram that illustrates a decoder in accordance with some embodiments of the present disclosure.

FIG. 10 is a block diagram illustrating an example of video decoder 300 which may be video decoder 114 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., items 1-8).

Figure 7:
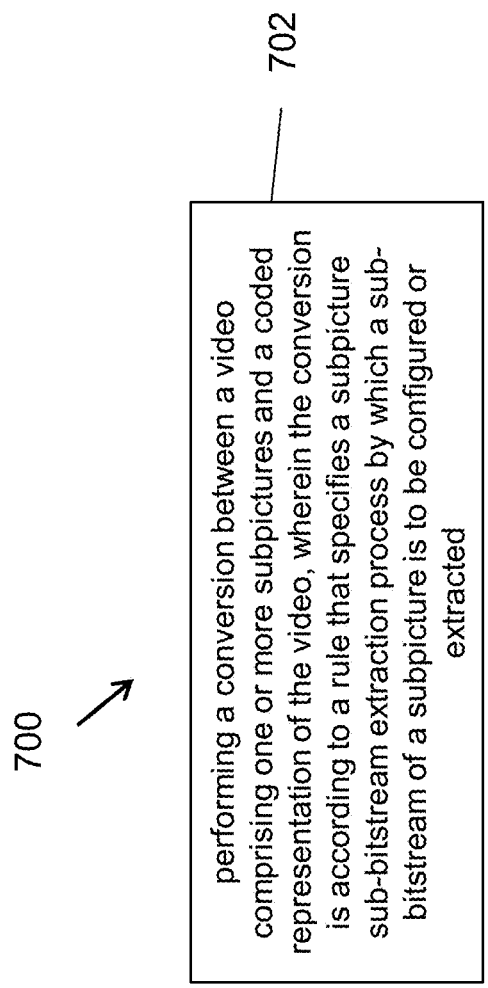
FIG. 7 is a flowchart for an example method of video processing.

1. A video processing method (e.g., method 700 depicted in FIG. 7), comprising: performing (702) a conversion between a video comprising one or more subpictures and a coded representation of the video, wherein the coded representation is organized in one or more network abstraction layer (NAL) units, wherein the conversion is according to a rule that specifies a subpicture sub-bitstream extraction process by which a sub-bitstream of a subpicture is to be configured or extracted.

The following solutions show example embodiments of techniques discussed in the previous section (e.g., item 1)

2. The method of solution 1, wherein the rule specifies that a supplemental enhancement information (SEI) NAL unit that includes a scalable-nested SEI message that is not applicable to an output bitstream is removed from the output bitstream.

The following solutions show example embodiments of techniques discussed in the previous section (e.g., item 2)

3. The method of any of solutions 1-2, wherein the rule specifies that a subpicture index for identifying a subpicture sequence corresponds to a subpicture index of to-be-extracted subpictures in a video layer comprising multiple subpictures per picture.

The following solutions show example embodiments of techniques discussed in the previous section (e.g., item 3).

4. The method of any of solutions 1-3, wherein the rule specifies that, in case that a number of layers in an output layer set is one, to rewrite a first syntax element indicative of a general level and a second syntax element indicative of a layer level to another value.

The following solutions show example embodiments of techniques discussed in the previous section (e.g., item 4).

5. The method of any of solutions 1-4, wherein the rule specifies that, in case that a number of layers in an output layer set is one, to rewrite a first syntax element indicative of size of a coded picture buffer and a second syntax element indicative of bitrate to another value (e.g., an appropriate value as described herein).

The following solutions show example embodiments of techniques discussed in the previous section (e.g., items 5-8).

6. The method of any of solutions 1-5, wherein the rule specifies to rewrite a value of a syntax field indicative of a coded bitrate to in a references video parameter set or a sequence parameter set to another value (e.g., an appropriate value as described herein).

7. The method of any of solutions 1 to 6, wherein the conversion comprises encoding the video into the coded representation.

8. The method of any of solutions 1 to 6, wherein the conversion comprises decoding the coded representation to generate pixel values of the video.

9. A video decoding apparatus comprising a processor configured to implement a method recited in one or more of solutions 1 to 8.

10. A video encoding apparatus comprising a processor configured to implement a method recited in one or more of solutions 1 to 8.

11. A computer program product having computer code stored thereon, the code, when executed by a processor, causes the processor to implement a method recited in any of solutions 1 to 8.

12. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

In some preferred embodiments, a first set of solutions may be implemented as further described in items 1 and 2 in Section 5.

Figures 13A, 13B:
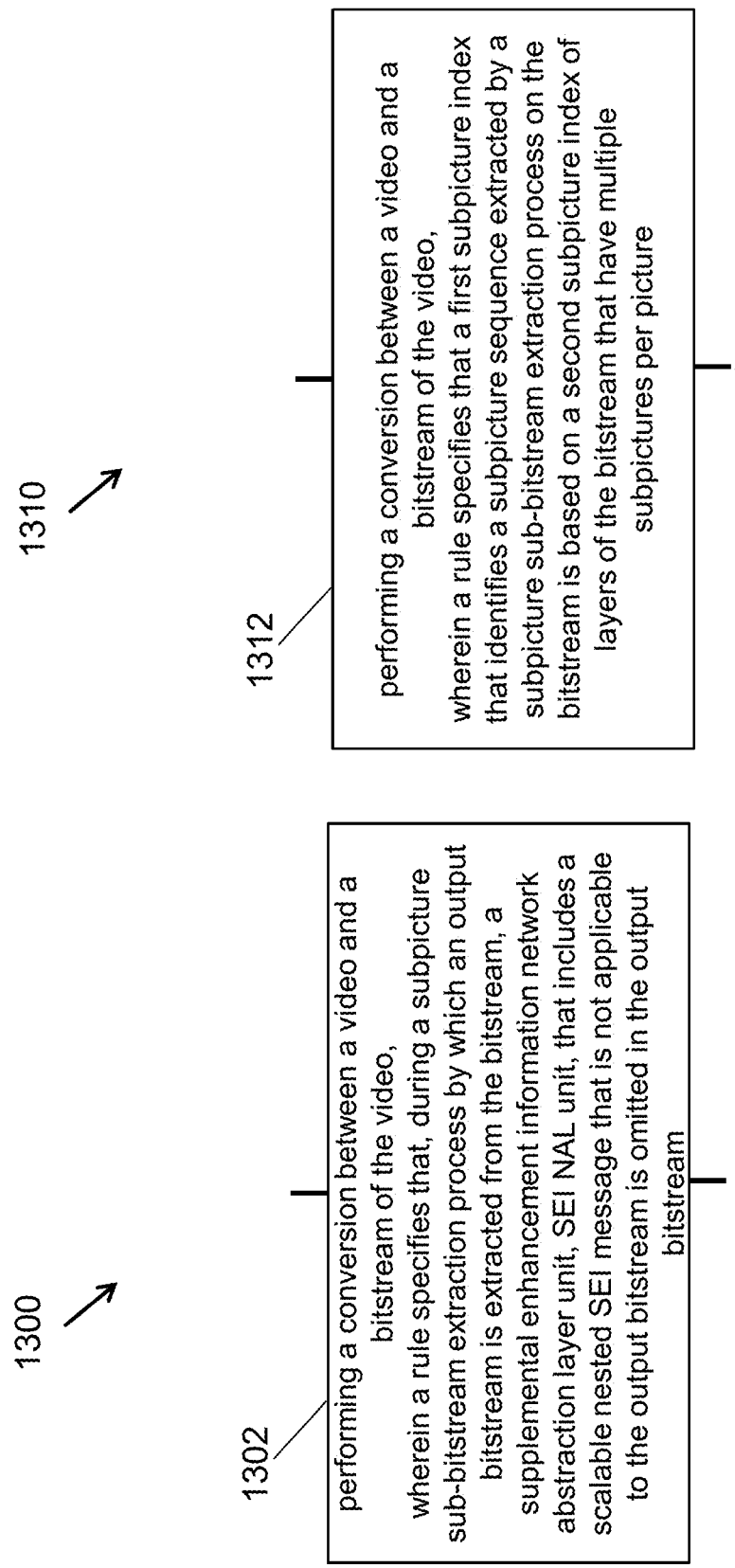
FIGS. 13A-13D show example flowcharts for video data processing methods.

1. A method of processing video data (e.g., method 1300 depicted in FIG. 13A), comprising: performing (1302) a conversion between a video and a bitstream of the video, wherein the bitstream comprises multiple layers comprising one or more subpictures according to a rule; wherein the rule specifies that, during a subpicture sub-bitstream extraction process by which an output bitstream is extracted from the bitstream, a supplemental enhancement information (SEI) network abstraction layer (NAL) unit that includes a scalable nested SEI message that is not applicable to the output bitstream is omitted in the output bitstream.

2. The method of solution 1, wherein the output bitstream includes one or more output layers including subpictures identified by one or more target subpicture indexes, and wherein the SEI NAL unit is considered not applicable to the output bitstream responsive to the scalable nested SEI including a flag having a predetermined value and a first one or more subpicture indexes of the SEI NAL unit not matching a second one or more subpicture indexes in the output bitstream.

3. The method of solution 2, wherein the flag having the predetermined value indicates that the SEI NAL unit is applicable to a specific subpicture of a specific layer.

4. The method of solutions 2-3, wherein the flag is sn_subpic_flag.

5. The method of any of solutions 2-4, wherein the first one or more subpicture indexes are sn_subpic_idx[j], where j is an integer with a value from 0 to sn_num_subpics_minus1, and wherein the second one or more subpicture indexes are subpicIdxTarget[i], where i is an integer, for layers in the output bitstream that have multiple subpictures per picture.

6. A method of processing video data (e.g., method 1310 depicted in FIG. 13B), comprising: performing a conversion between a video and a bitstream of the video, wherein the bitstream comprises multiple layers comprising one or more pictures comprising one or more subpictures according to a rule; wherein the rule specifies that a first subpicture index that identifies a subpicture sequence extracted by a subpicture sub-bitstream extraction process on the bitstream is based on a second subpicture index of layers of the bitstream that have multiple subpictures per picture.

7. The method of solution 6, wherein the rule specifies that the first subpicture index is responsive to a subpicture level information supplemental enhancement information, SLI SEI, message being included in the bitstream.

In some preferred embodiments, a second set of solutions may be implemented as further described in items 3, 4 and 5 in Section 5.

Figures 13C, 13D:
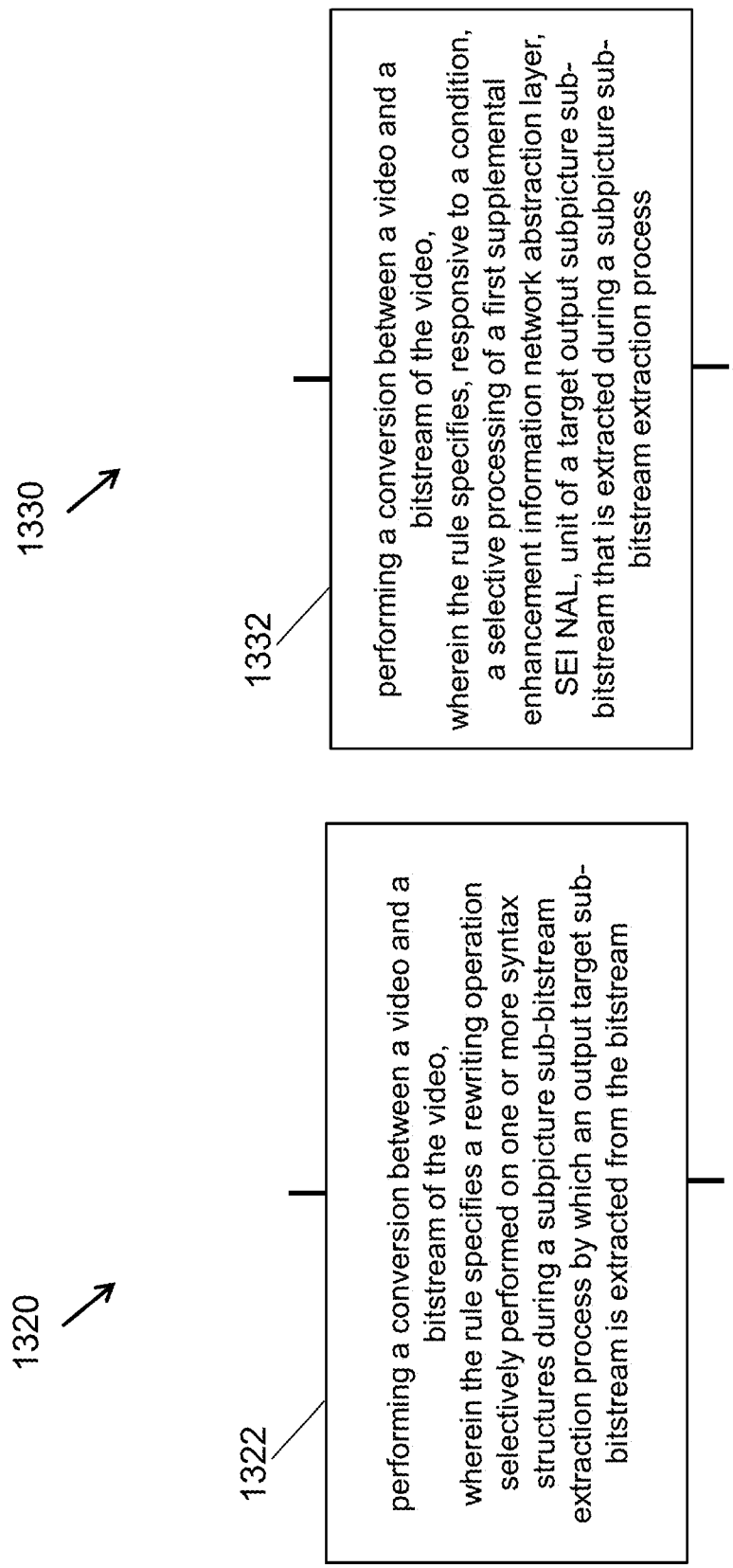

1. A method of processing video data (e.g., method 1320 depicted in FIG. 13C), comprising: performing (1322) a conversion between a video and a bitstream of the video, wherein the bitstream comprises one or more layers comprising one or more sublayers comprising one or more pictures comprising one or more subpictures according to a rule, wherein the rule specifies a rewriting operation selectively performed on one or more syntax structures during a subpicture sub-bitstream extraction process by which an output target sub-bitstream is extracted from the bitstream, wherein the one or more syntax elements include information of the output target sub-bitstream.

2. The method of solution 1, wherein the one or more syntax structures include: (a) a first syntax structure that indicates a coding level to which the output target sub-bitstream conforms, and (b) a second syntax structure that indicates coding levels to which sublayer sequences in the output target sub-bitstream having index values 0 to tIdTarget−1 conform, where tIdTarget is an integer representing a highest temporal layer identifier of sublayers in the output target sub-bitstream.
3. The method of solution 1, wherein the one or more syntax elements include: (a) a first syntax structure that is indicative of a coded picture buffer size of each sublayer sequence in the output target sub-bitstream, and (b) a second syntax structure that indicates a bitrate value of each sublayer sequence in the output target sub-bitstream.
4. The method of solution 1, wherein the one or more syntax elements include: (a) a first syntax structure that is indicative of whether each sublayer sequence in the output target sub-bitstream is handled as having a constant bitrate.
5. The method of solutions 1-2, wherein the first syntax structure and the second syntax structure are included in a video parameter set references by the output target sub-bitstream.
6. The method of solutions 1-2, wherein, in case that the output target sub-bitstream comprises a single layer, the first syntax structure and the second syntax structure are included in a sequence parameter set referenced by the output target sub-bitstream.

In some preferred embodiments, a third set of solutions may be implemented as further described in items 6, 7 and 8 in Section 5.

1. A method of processing video data (e.g., method 1330 depicted in FIG. 13D), comprising: performing (1332) a conversion between a video and a bitstream of the video, wherein the bitstream comprises one or more layers comprising one or more pictures comprising one or more subpictures according to a rule, wherein the rule specifies, responsive to a condition, a selective processing of a first supplemental enhancement information network abstraction layer, SEI NAL, unit of a target output subpicture sub-bitstream that is extracted during a subpicture sub-bitstream extraction process.
2. The method of solution 1, wherein the processing includes generating the first SEI NAL unit.
3. The method of any of solutions 1-2, wherein the processing includes adding the first SEI NAL unit to a picture unit that includes a second SEI NAL unit.
4. The method of any of solutions 1-3, wherein the processing includes adding the first SEI NAL unit to a picture unit that includes a second SEI NAL unit immediately after the second SEI NAL unit.
5. The method of any of solutions 1-4, wherein the processing includes extracting a scalable nested SEI message from a scalable nesting SEI message in the second SEI NAL unit and including the extracted scalable nested SEI message in the first SEI NAL unit as a non-scalable-nested SEI message.
6. The method of any of solutions 1-5, wherein the processing includes removing a second SEI NAL unit from the target output subpicture sub-bitstream.
7. The method of any of solutions 1-6, wherein the condition comprises: (a) the target output subpicture sub-bitstream includes the second SEI NAL unit that includes a scalable nesting SEI message, (b) a syntax field in the scalable nesting SEI message is set to a value that indicates that the scalable nesting SEI message is applicable to same set of layers as in the target output subpicture sub-bitstream, and (c) the scalable nesting SEI message is applicable to same set of subpictures as in the target output subpicture sub-bitstream.
8. The method of solution 1, wherein the condition comprises: (a) a list of layers in the target output subpicture sub-bitstream does not include all layers in the bitstream, (b) the target output subpicture sub-bitstream includes a scalable nesting SEI messages, and wherein the processing includes keeping the first SEI NAL unit in the target output subpicture sub-bitstream unchanged.
9. The method of any of solutions 1-8, wherein the first SEI NAL unit is seiNalUnitB.
10. The method of any of solutions 1-9, wherein the second SEI NAL unit is seiNalUnitA.

With reference to the above-listed first, second and third set of solutions, in some embodiments, the video comprises a 360-degree video. In some embodiments, the conversion comprises encoding the video into the bitstream. In some embodiments, the conversion comprises decoding the bitstream to generate pixel values of the video.

Some embodiments may include a video decoding apparatus comprising a processor configured to implement a method recited in the first, second or third list of solutions.

Some embodiments may include a video encoding apparatus comprising a processor configured to implement a method recited in one or more of solutions 1 to 8.

In some embodiments, a method of storing a bitstream representing a video to a computer-readable recording medium may be implemented. The method includes generating the bitstream from the video according to a method described in any one or more of the above-listed solutions and storing the bitstream in the computer-readable recording medium.

Some embodiments may include a computer readable medium that stores the bitstream generated according to any one or more of the above-listed solutions.

Some embodiments may include a computer program product having computer code stored thereon, the code, when executed by a processor, causes the processor to implement a method recited in any of the above listed solutions.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
performing a conversion between a video and a bitstream of the video,
wherein the bitstream comprises multiple layers comprising one or more pictures comprising one or more subpictures according to a first rule, and
wherein the first rule specifies that, during a subpicture sub-bitstream extraction process by which an output bitstream is extracted from the bitstream, a supplemental enhancement information (SEI) network abstraction layer (NAL) unit that includes a scalable nesting SEI message that is not applicable to the output bitstream is removed from the output bitstream;
wherein the bitstream comprises one or more layers comprising one or more pictures comprising one or more subpictures further according to a third rule, and
wherein the third rule specifies that one or more processes of a first supplemental enhancement information (SEI) network abstraction layer (NAL) unit of a target output subpicture sub-bitstream that is extracted during a subpicture sub-bitstream extraction process is performed and a second SEI NAL unit in the target output subpicture sub-bitstream is removed, when the second SEI NAL unit meets a condition.

2. The method of claim 1, wherein the output bitstream includes one or more output layers including subpictures identified by one or more target subpicture indexes, and
wherein the SEI NAL unit is considered not applicable to the output bitstream responsive to the scalable nesting SEI with a flag having a predetermined value and a first one or more subpicture identifiers of the SEI NAL unit not matching a second one or more subpicture identifiers in the output bitstream.

3. The method of claim 2, wherein the flag having the predetermined value indicates that the SEI NAL unit containing scalable-nested SEI messages in the scalable nesting SEI message is applicable to a specific subpicture of a specific layer.

4. The method of claim 2, wherein the flag having the predetermined value is sn_subpic_flag equal to 1.

5. The method of claim 2, wherein the first rule specifies that one or more subpicture indexes that identify a subpicture sequence extracted by the subpicture sub-bitstream extraction process are based on the one or more target subpicture indexes of layers that have multiple subpictures per picture, and
wherein the layers that have multiple subpictures per picture are layers for which referenced sequence parameter sets have a syntax element sps_num_subpics_minus1 greater than 0.

6. The method of claim 1, wherein the video comprises a 360-degree video.

7. The method of claim 1, wherein the bitstream comprises one or more layers comprising one or more sublayers comprising one or more pictures comprising one or more subpictures according to a second rule,
wherein the second rule specifies a rewriting operation selectively performed on one or more syntax elements during a subpicture sub-bitstream extraction process by which an output target sub-bitstream is extracted from the bitstream, and
wherein the one or more syntax elements include information of the output target sub-bitstream.

8. The method of claim 7, wherein the one or more syntax elements include: (a) a first syntax element that indicates a coding level to which the output target sub-bitstream conforms, and (b) a second syntax element that indicates coding levels to which sublayer sequences in the output target sub-bitstream having index values 0 to tIdTarget-1 conform, where tIdTarget is an integer representing a target highest temporal layer identifier of sublayers in the output target sub-bitstream, or
wherein the one or more syntax elements include: (a) a third syntax element that is indicative of a coded picture buffer (CPB) size of each sublayer sequence in the output target sub-bitstream, and (b) a fourth syntax element that indicates a bit rate value of each sublayer sequence in the output target sub-bitstream, wherein the each sublayer sequence has an index value k, k in a range of 0 to tIdTarget, inclusive, where tIdTarget is an integer representing the target highest temporal layer identifier of sublayers in the output target sub-bitstream, or
wherein the one or more syntax elements include: a fifth syntax element that is indicative of whether a sublayer sequence with a target highest temporal layer identifier tIdTarget in the output target sub-bitstream is handled as having a constant bit rate.

9. The method of claim 7, wherein when present, the one or more syntax elements are included in a video parameter set referenced by the output target sub-bitstream.

10. The method of claim 7, wherein, in case that the output target sub-bitstream comprises a single layer, the one or more syntax elements are included in a sequence parameter set referenced by the output target sub-bitstream.

11. The method of claim 1, wherein the one or more processes include generating the first SEI NAL unit.

12. The method of claim 11, wherein the one or more processes include adding the first SEI NAL unit to a picture unit that includes the second SEI NAL unit, or
wherein the one or more processes include adding the first SEI NAL unit to a picture unit that includes the second SEI NAL unit immediately after the second SEI NAL unit, or
wherein the one or more processes include extracting a scalable nested SEI message from a scalable nesting SEI message in the second SEI NAL unit and including the extracted scalable nested SEI message in the first SEI NAL unit as a non-scalable-nested SEI message.

13. The method of claim 1, wherein the condition comprises: (a) the target output subpicture sub-bitstream includes the second SEI NAL unit that includes a scalable nesting SEI message, (b) a first syntax field in the scalable nesting SEI message is equal to a value that indicates that scalable-nested SEI messages in the scalable nesting SEI message are applicable to same output layer sets as in the target output subpicture sub-bitstream, and a second syntax field in the scalable nesting SEI message is equal to a value that indicates that the scalable-nested SEI messages that apply to specified output layer sets or layers apply only to specific subpictures of the specified output layer sets or layers, and (c) the scalable nesting SEI message is applicable to the same set of layers and subpictures as in the target output subpicture sub-bitstream, or
wherein the condition comprises: (a) a number of layers in an output layer set which is a same set of layers as in the target output subpicture sub-bitstream is equal to 1, (b) the target output subpicture sub-bitstream includes the second SEI NAL unit that includes a scalable nesting SEI message, (c) the first syntax field in the scalable nesting SEI message is equal to a value that indicates that the scalable-nested SEI messages in the scalable nesting SEI message are applicable to a same layer as in the target output subpicture sub-bitstream, and the second syntax field in the scalable nesting SEI message is equal to a value that indicates that the scalable-nested SEI messages that apply to specified output layer sets or layers apply only to specific subpictures of the specified output layer sets or layers, and (d) the scalable nesting SEI message is applicable to the same layer and subpictures as in the target output subpicture sub-bitstream.

14. The method of claim 1, wherein the first SEI NAL unit is seiNalUnitB and the second SEI NAL unit is seiNalUnitA.

15. The method of claim 1, wherein the conversion comprises encoding the video into the bitstream.

16. The method of claim 1, wherein the conversion comprises decoding the bitstream to generate pixel values of the video.

17. An apparatus for processing video data comprising a processor and a non-transitory memory with instructions thereon, wherein the instructions upon execution by the processor, cause the processor to:
perform a conversion between a video and a bitstream of the video,
wherein the bitstream comprises multiple layers comprising one or more pictures comprising one or more subpictures according to a first rule,
wherein the first rule specifies that, during a subpicture sub-bitstream extraction process by which an output bitstream is extracted from the bitstream, a supplemental enhancement information (SEI) network abstraction layer (NAL) unit that includes a scalable nesting SEI message that is not applicable to the output bitstream is removed from the output bitstream;
wherein the bitstream comprises one or more layers comprising one or more pictures comprising one or more subpictures further according to a third rule, and
wherein the third rule specifies that one or more processes of a first supplemental enhancement information (SEI) network abstraction layer (NAL) unit of a target output subpicture sub-bitstream that is extracted during a subpicture sub-bitstream extraction process is performed and a second SEI NAL unit in the target output subpicture sub-bitstream is removed, when the second SEI NAL unit meets a condition.

18. A non-transitory computer-readable storage medium storing instructions that cause a processor to:
perform a conversion between a video and a bitstream of the video,
wherein the bitstream comprises multiple layers comprising one or more pictures comprising one or more subpictures according to a first rule, and wherein the first rule specifies that, during a subpicture sub-bitstream extraction process by which an output bitstream is extracted from the bitstream, a supplemental enhancement information (SEI) network abstraction layer (NAL) that includes a scalable nesting SEI message that is not applicable to the output bitstream is removed from the output bitstream;

wherein the bitstream comprises one or more layers comprising one or more pictures comprising one or more subpictures further according to a third rule, and wherein the third rule specifies that one or more processes of a first supplemental enhancement information (SEI) network abstraction layer (NAL) unit of a target output subpicture sub-bitstream that is extracted during a subpicture sub-bitstream extraction process is performed and a second SEI NAL unit in the target output subpicture sub-bitstream is removed, when the second SEI NAL unit meets a condition.

19. A method for storing a bitstream of a video, comprising:

generating the bitstream of the video; and storing the bitstream in a non-transitory computer-readable recording medium, wherein the bitstream comprises multiple layers comprising one or more pictures comprising one or more subpictures according to a first rule, and wherein the first rule specifies that, during a subpicture sub-bitstream extraction process by which an output bitstream is extracted from the bitstream, a supplemental enhancement information (SEI) network abstraction layer (NAL) that includes a scalable nesting SEI message that is not applicable to the output bitstream is removed from the output bitstream;

wherein the bitstream comprises one or more layers comprising one or more pictures comprising one or more subpictures further according to a third rule, and wherein the third rule specifies that one or more processes of a first supplemental enhancement information (SEI) network abstraction layer (NAL) unit of a target output subpicture sub-bitstream that is extracted during a subpicture sub-bitstream extraction process is performed and a second SEI NAL unit in the target output subpicture sub-bitstream is removed, when the second SEI NAL unit meets a condition.

\* \* \* \* \*